United States Patent [19]

Erdman

[11] 4,068,648

[45] Jan. 17, 1978

[54] BRICK SAW APPARATUS

[76] Inventor: Peter M. Erdman, 320 Ainakea Way, Honolulu, Hawaii 96815

[21] Appl. No.: 629,393

[22] Filed: Nov. 6, 1975

[51] Int. Cl.$^2$ ............................................. B28D 1/04
[52] U.S. Cl. ..................................... 125/13 R; 51/270
[58] Field of Search ...................... 125/12, 13; 51/268, 51/270, 177, 8 C

[56] References Cited

U.S. PATENT DOCUMENTS

| 1,419,717 | 6/1922 | Cary | 51/8 C |
|---|---|---|---|
| 2,301,164 | 11/1942 | Mall | 51/177 |
| 2,431,469 | 11/1947 | Eyles | 125/13 R |
| 2,609,555 | 9/1952 | Anderson | 51/177 |
| 3,844,269 | 10/1974 | Rater | 125/13 R |

Primary Examiner—Harold D. Whitehead
Attorney, Agent, or Firm—James C. Wray

[57] ABSTRACT

A rotating brick saw has an enclosure which substantially surrounds a rotating saw, a sliding table which carries a brick into the saw and tracks on which the table slides. The enclosure has an opening at its distal end and a pit beneath the opening for collecting sawed particles. The sliding table has a wiper at its distal end to wipe sawed particles along a base of the enclosure into the opening and pit. A door closes an opening at the front of the enclosure, and the door has a flexible wiper at its base which wipes the table as it slides outward of the enclosure. A chute on the door guides sawed particles downward to the table and through an aperture in the table into a pit near a proximal end of the saw enclosure. The rear wall and front door of the enclosure are sloped inward to further aid in the deflection of sawed particles toward the particle-collecting pits.

13 Claims, 8 Drawing Figures

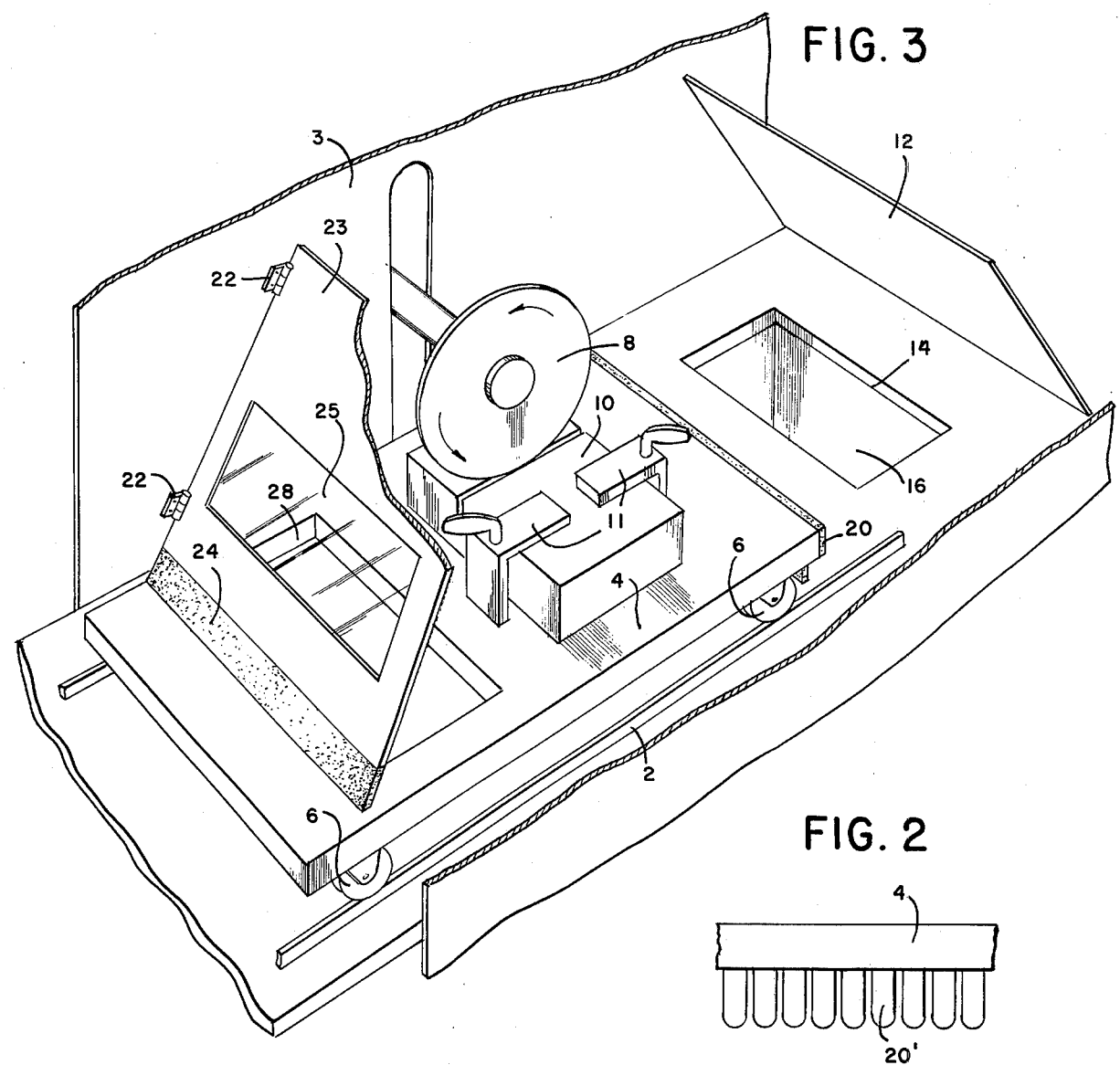
FIG. 3
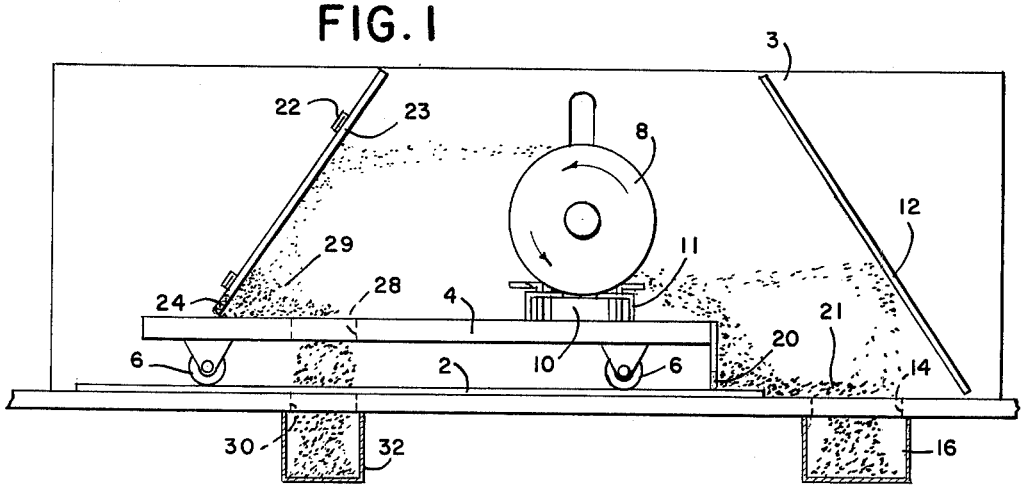
FIG. 2
FIG. 1

BRICK SAW APPARATUS

BACKGROUND OF THE INVENTION

Brick saws have been used with vacuum devices to draw sawed particles into porous bags for eliminating some of the dust. Those devices require additional power to operate the vacuum device and are unsuccessful in catching the dust particles which are messy and unpleasant to the operator as well as dangerous to the persons around a saw. Some devices bathe the saw in cutting liquid. Although the cutting liquid gathers up dust particles, their primary purpose is to cool the saw blade. The resulting process makes the liquid difficult to clean for reuse. If water is used, the particles pollute the stream flowing from the brick saw. Moreover, sprays and small shrouds are ineffective in catching all of the particles flung from a saw.

U.S. Pat. No. 3,311,103 shows a hooded saw and an apron 81 which deflects dust to the pan 19. None of the novel structure of the present invention is shown in that patent.

U.S. Pat. No. 3,807,095 is a recent example of a brick sawing patent showing a dust removal suction device which is part of the prior art, but which does not suggest this invention.

U.S. Pat. No. 3,635,206 is a recent example of a patent showing a dust deflector unnumbered at the rear of the assembly. That patent does not suggest the novel features of the invention.

U.S. Pat. No. 3,008,462 is an earlier example of a hooded brick saw. However, the hood is primarily intended to retain liquids in which the saw is partially immersed for cooling.

U.S. Pat. No. 2,863,441 shows general improvements to a saw carriage. U.S. Pat. No. 3,034,493 is an example of the closest art which was found for other types of saws.

A need exists for brick saws which adequately protect personnel around the saw from being struck by flying particles or from ingesting particulate dust from brick saws. A need exists for entrapping particles flung from brick saws while conserving energy and avoiding need for further power consumption in vacuuming sawed particles.

SUMMARY OF THE INVENTION

Briefly, the invention is a brick saw shield, which protects a worker, eliminates dust, and avoids need for power consumption. Preferred embodiments of the shield and collector are best described in the drawing and detailed description. An ordinary brick saw has a rolling support. The invention adds a large hole in the frontal portion of the support, through which dust falls. A newly added door at the front of the saw deflects dust downward. A wiper at the bottom of the door scrapes along the rolling support to prevent outward egress of dust. A guide inside the door focuses flow of dust downward through the support hole into a pit. A deflector and chute at the back of the saw trap dust. A downward projecting wiper at the rear of the support scrapes dust rearward into the chute as the support is moved rearward.

The following improvements are of primary importance in the present invention: the door behind the saw deflects dust down into the pit; the wiper connected to the roller support scrapes dust into the pit and cleans roller slide; the wiper on the door in front of the saw scrapes dust from the roller support as it is withdrawn. In addition, the invention provides an attachment of a chute guide to the front door, and employment of a hole cut into the roller support. The present improvements apply to many different types of saws in a variety of fields, where workers come in direct contact with flying particles flung from a saw, and where suction devices may have been used. For example, the present methods and apparatus apply to the wood, glass and light metal industries.

The following gives a clear picture of the size, power, and type of brick saw dust collector currently used. The fan blower has a voltage of 230/460, ½ horsepower, approximate size of metal casing covering electric motor is 1½ feet cubed, the suction tube outside is approximately one foot in diameter, and the approximate size of the complete brick saw is 5 foot × 5 foot × 6 foot.

The apparatus and the following three functions are new and unique. A method of cutting, a method of protection, a method of disposal, as well as the reduction of energy consumption by eliminating the initial cost of the fan and electric motor.

The coordination of wooden support under the rubber wiper perpendicular to each other, the operation of a brick saw without a pump, blower or suction device; protection of body and face by safety glass and metal plate, eliminating the hazardous situation of fingers being cut by moving manual operation away from direct contact of saw's blades, the convenient disposal of dust into the garbage receptacle at full extension of wooden support by the direction and blockage of wiper and support, the inward tapering receptacle and its door designed for quick and easy ultimate disposal, receptacles designed for simple construction as well as for support of the extending wood board, and the employment of guides to facilitate its motion, saving the cost of buying the motor and fan initially or using the existing ones elsewhere for ventilation or other purposes are objects and features of the invention.

The cost of the simple construction of the metal door and garbage receptacle minus the cost of eliminating the blower, at worst, cancel each other. More likely it will save money by this fact alone, not taking into account any other beneficial factors mentioned previously as well as power savings over any time period covered. Thus, in effect, one would save expense at the moment of installment and save additional expense over the period of operation.

One object of the invention is the provision of a brick saw apparatus having a frame, a track mounted on the frame for limiting movement of a device moving on the track, a slidable table mounted on the track for reciprocating movement forward and rearward along the track, an enclosure mounted on the frame and partially surrounding the track and the sliding table for gathering sawed particles, a circular saw mounted in the enclosure above the sliding table and being oriented parallel to a direction of table movement, an opening at a distal end of the enclosure for receiving sawed particles from the enclosure, and a pit connected beneath the opening for receiving sawed particles from the opening.

Another object of the invention is the provision of a brick saw apparatus having an enclosure with a front opening above the sliding table at a proximal end of the enclosure, and connective means connected peripherally to the opening, and a door connected to the connective means for selectively opening and closing the front opening, whereby sawed particles are prevented from leaving the enclosure when the door is closed.

This invention has as a further object, the provision of a brick saw apparatus with an opening at the proximal end of an enclosure including room for a sliding table to slide through the opening, and with a door positioned above the sliding table and a flexible wiper attached to a bottom of the door and extending downward to the sliding table for wiping the sliding table as the table slides in a proximal direction from beneath the door.

Another object of the invention is the provision of a brick saw apparatus with flexible-stripped bristles extending downward from a front door to a sliding table, and downward from a sliding table to a floor of an enclosure.

The invention has as another object the provision of a brick saw apparatus with an enclosure and a front opening and a hinge connected to a periphery of the proximal opening and connected peripherally to a door whereby the door swings outward with respect to the enclosure for access to the enclosure.

Another object of the invention is the provision of a brick saw apparatus with an enclosure having an upward and rearward sloping proximal end, and an opening in the proximal end sloping upward and rearward, and wherein a door mounted in the opening slopes upward and rearward whereby sawed particles striking the closed door are deflected downward toward the sliding table.

The invention has as another object the provision of a brick saw apparatus with a sliding table having a large aperture whereby sawed particles fall through the aperture into a pit inside a proximal end of an enclosure.

A further object of the invention is the provision of a brick saw apparatus wherein the door opens inward and has a downward sloped chute connected across and inside of the door for catching sawed particles in an open upper end of the chute and passing sawed particles downward through the chute and outward through the open lower end to the sliding table and through the aperture in the sliding table to a pit.

The invention has a further object the provision of a brick saw apparatus with an enclosure having a downward and rearward sloping distal face above a distal opening for deflecting sawed particles through the opening into a pit.

A further object of the invention is the provision of a brick saw apparatus with a flexible wiper mounted on a distal end of a sliding table and extending downward from the sliding table to a floor of an enclosure for wiping sawed particles rearward toward an opening in the floor.

BRIEF DESCRIPTION OF THE DRAWINGS

FIG. 1 is a side elevation schematic view of the brick saw apparatus of the present invention.

FIG. 2 is a detail of flexible wiper fingers used with the saw.

FIG. 3 is a perspective schematic view of the brick saw apparatus of the present invention.

DETAILED DESCRIPTION OF THE DRAWINGS

Figures 4, 5, 6:
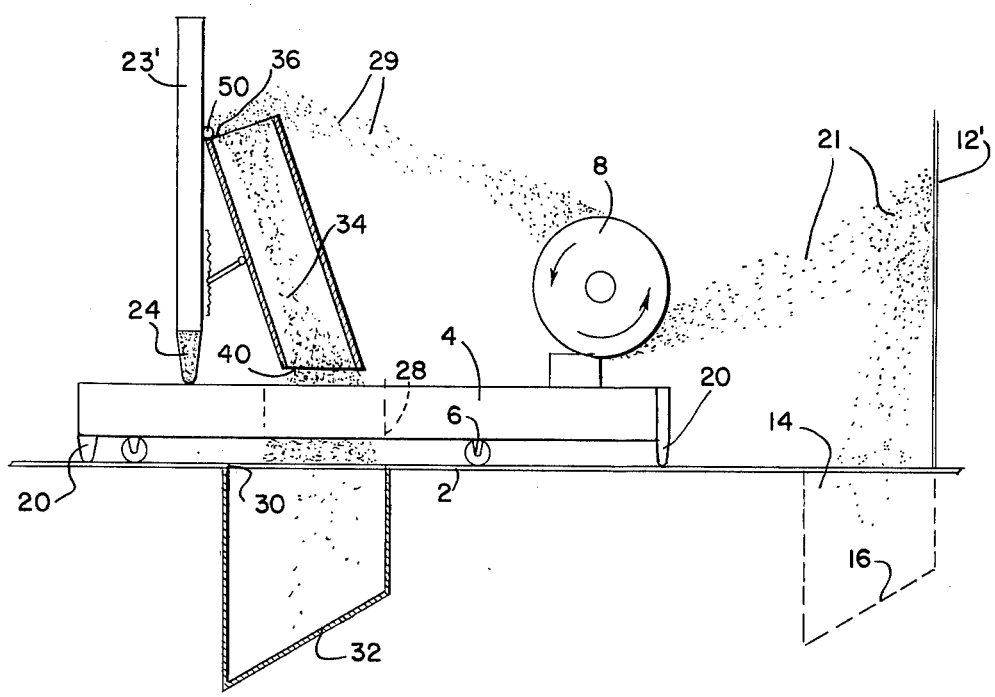
FIG. 4 is a schematic of an orthoganol embodiment of the invention.
FIG. 5 is an elevational detail of the door and dust chute.
FIG. 6 is a side elevational detail of chute adjustment means.

Referring to FIGS. 1 and 3 a brick saw apparatus has a base and tracks 2 mounted on the base between opposite sidewalls 3. A slidable table means 4 has wheels 6 for mounting on the track 2 so that the table may reciprocate forward and rearward along the track. A vertically adjustable rotary saw 8 cuts brick 10 which is held in place on table 4 by clamps 11.

Dust particles from the brick saw are contained within an enclosure which is formed by the base, sidewalls 3 and a sloping rear wall 12.

An opening means 14 at the distal end of the enclosure receives dust and sawed particles from the enclosure means, and a pit 16 mounted beneath the opening means 14 receives sawed particles from the opening.

As shown in FIG. 1, the rotating saw drives particles rearward against the sloping 12, from whence the particles are deflected through opening 14 into pit 16. Some of the sawed particles having less velocity fall onto the table or beyond the end of the table onto the base adjacent tracks 2. A wiper 20 mounted at the distal end of the sliding table 4 wipes particles 21 on the base through the opening 14 into pit 16.

At the proximal end of the enclosure, hinges 22 mount a swingable door 23 in front of the saw blade. The door carries at its lower edge a wiper 24. Wiper 24 wipes particles along the surface of the sliding table and maintains the particles within the enclosure. A window 25 is provided in the door to observe the operation of the saw.

An opening 28 is provided in the table so that sawed particles 29 which are collected on the table surface may fall through the table opening 28 and through an opening 30 in the base into a second pit 32. In use, the sawed particles are guided further by wiper 24 connected vertically to the rolling support at the proximal end of the opening which also scrapes dust into pit and cleans roller slide.

As shown in FIG. 2, the solid wipers 20 may be replaced by a series of flexible fingers 20' which are attached to the bottom of table 4 near the distal end. A similar series of flexible fingers 20' may be used in conjunction with the wiper 24 on the door 23. Usage of either will depend on type of operation.

The bristle-type wipers 20' shown in FIG. 2 are better suited where the cutting operation is a dry one. The bristles 20' produce a brushing and flicking motion which are more desirable for lifting dry waste particles toward the rear dust bin 16.

In sawing or grinding operations using fluids to control temperatures of the saw blade and cutting object, solid wipers such as shown in FIGS. 1 and 3 at the numbers 20 are preferred. The solid wipers have a squeegee-like effect. The fluid with the entrapped particles is readily pushed toward the collection pans by the wipers 20 as they wipe the surface substantially free of the liquid.

A second embodiment of the invention is shown in FIGS. 4, 5, and 6. In that embodiment the proximal facade of the enclosure consists of the door 23' which is substantially vertical and an adjustable chute. The adjustable chute attached to the door provides for a broad range of deflection and entrapment. The distal facade of the enclosure consists of the rear access plate 12 and an adjustable chute (not shown) which is virtually identical to the front door for the same reason. The front door 23' is also substantially vertical, for the same reason. Inside the front door, there is mounted a guide chute 34 for guiding deflected dust and waste particles from the door through an upward opening 36 downward and outward through a lower opening 40. The dust and particles fall through opening 28 in movable support 4 and then through opening 30 into collection bin 32.

As shown in FIG. 5, guider chute 34 has inward sloping sides 38 to concentrate the flow of the dust and particles. A rod 44 mounted on the back of the chute 34 has legs 46 which engage notches 48 in the door to hold the chute at the desired angle. The upper edge of the chute is secured to the inside of the door 23' by a piano-type hinge 50.

As shown in the detail of FIG. 6, chute 34 is mounted on door 23' by hinge 50. An adjusting device generally indicated by the FIG. 52 has ends which rotatably engage fixtures 54 and 56 on the door and chute respectively. The extension of telescoping elements 58 is controlled by adjusting nut 60 in a conventional manner.

Figure 7:
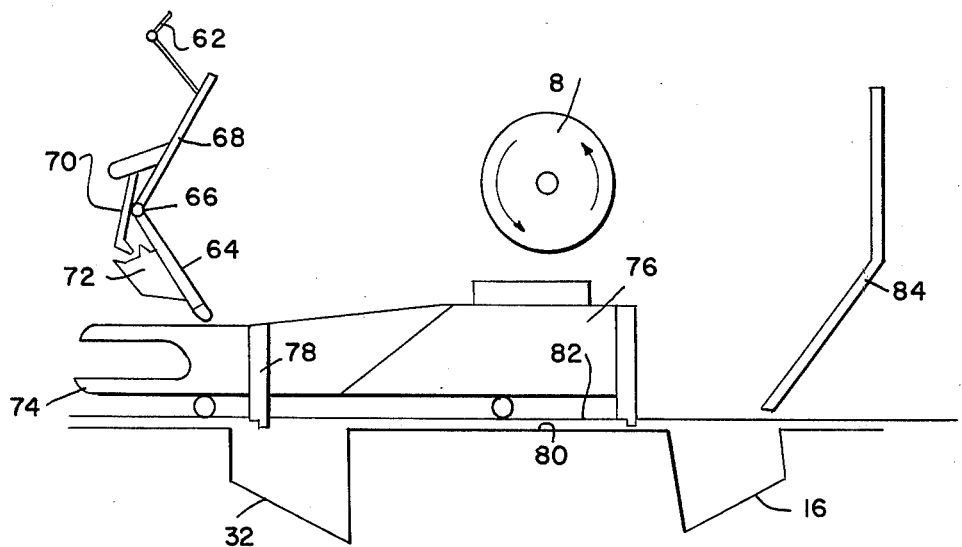
FIG. 7 is a schematic of a preferred embodiment of the invention.

As shown in FIG. 7, upper moveable arm 62 is connected to any upper non-moveable member of the saw fixture or the top of the surrounding workman's structure depending on type of saw apparatus. Door 64 is connected by hinge 66 to moveable plate 68. Lower latch arm 70 notch support 72 holds door 64 in desired position.

Cylindrical wooden handles 74 are connected to the sliding table 76. Wiper 78 guides further the downward path of waste particles, wipes dust into pit and cleans roller slide.

Two levels are shown, the level 80 at which the wiper 78 scrapes the dust into the pit 32 and the slightly higher elevation 82 on which the roller slide is mounted and cleaned. Bent rear wall 84 defects dust into pit 16.

Figure 8:
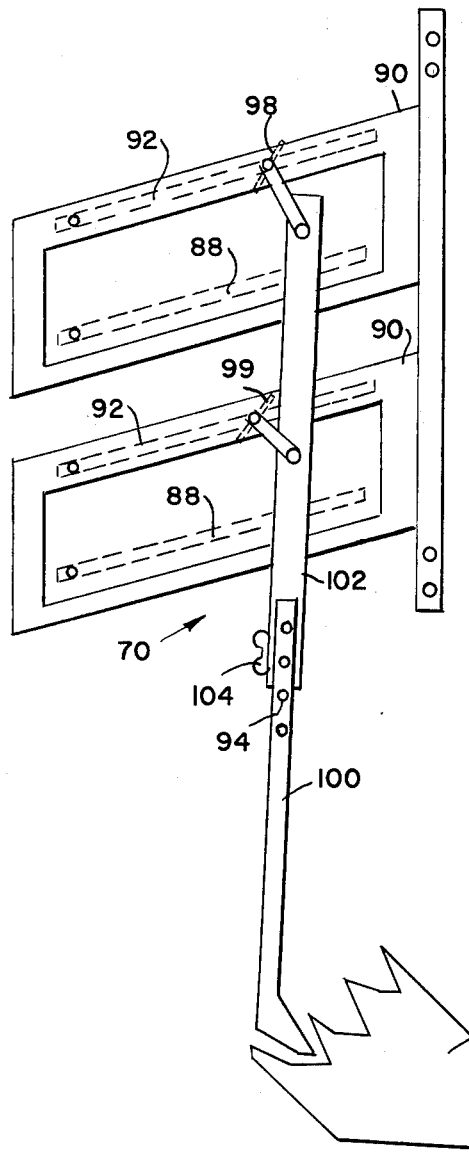
FIG. 8 is a detail of the adjustable latch of FIG. 7.

As shown in detail in FIG. 8, latch arm 70 has a back plate 86 with holes for screws to attach to plate 68. Open slot 88 of bars 90 through which latch arm is inserted is about two inches long.

Open slot 92 of bar 90 received winged nut and bolt for temporary securement. The latch arm 70 is made adjustable by holes 94 on an upper section of latch arm and a bolt and wing nut. The general shape of notches 72 is shown as if lower door section were at an angle and upper section straight. In that position, bolt and wing nut 98 would actually be positioned further to the left of the open slot and more to the left than the wing nut 99.

The adjustable latch 70 consists basically of back plate, two metal bars, latch arm and notch support 72. Metal bars extend about 5 inches which the notch support extends about 3 inches. The bottom portion 100 of latch arm 70 is made to be inserted into the upper latch arm portion 102 to be secured by wing nut and bolt 104. There are three locations with holes on upper latch arm. Two groups of several holes located at the top of the upper section permit adjusting for proper length of latch arm to correspond with desired latch arm angle upon fastening of wing nut and bolt on slots 92. The third location is one hole near the bottom end to correspond with one of the holes in the group at the top of the lower latch arm for desired length and fit of the tongue into the notch. The slots are perpendicular to each other, thus forming an "L" shaped bar with the vertex plane indicated in FIG. 7. In locked position, wing nuts 98 and 99 have wings extended over the slots. Latch arm 70 is larger than the size of bolt, thus slots 88 are shown larger than slots 92. Optional bars 90 may be connected at outward ends by means of metal and rubber casing to be used as a handle to grip the upper plate 68 of door 64. Metal bars 90 are to be at an obtuse angle to plate 86 and parallel to each other.

Thus the adjustable latching device described with the long open slots and telescoping lower latch arm provides support for the lower guide door 64 at any angle up to 45° regardless of whether the upper door 68 is vertical or bends inward, while not obstructing the operator's view through the window. It is not desirable for the inward angle of lower door guide 64 to exceed 45°.

When upper section 68 of the door is vertical, lower section 64 of adjustable moving arm should be below the universal hinge at an angle of about 45°, if one were to draw lines through the hinge and lowermost end of arm to form a triangle. Wooden handles 74 could be cut from original cut of sliding cart 76 or added to rectangular cart at ends allowing worker to step in between if necessary.

While the saw is described as being a vertical adjustable saw, the present invention includes usage to all types of saw fixtures whether saw blades move vertically, horizontally or angularly with respect to the work piece, or whether the work piece moves vertically, horizontally or angularly with respect to the saw blade. It can readily be seen the employment of all three different embodiments of my invention can easily be constructed to saw fixtures consisting of only a saw (either circular or hand) and blade either of circular, hand, scroll or radial type and a rolling support on which the work piece is to be cut. Any one of the three embodiments described may lend itself more naturally and economically to the design and structure of the cutting apparatus more so than the others.

While the invention has been described with reference to specific embodiments, it will be obvious to those skilled in the art that modifications and variations of the invention may be constructed without departing from the spirit and scope of the invention. The scope of the invention is defined in the following claims.

What I claim is:

1. Brick saw apparatus comprising a frame having a base, track means mounted on the base of the frame for limiting movement of a device moving on the track, slidable table means mounted on the track for reciprocating movement forward and rearward along the track, enclosure means mounted on the frame and partially surrounding the track and sliding table for gathering sawed particles, the enclosure means having the base underneath the track, circular saw means mounted in the enclosure above the sliding table and being oriented parallel to a direction of table movement, an opening means in the base at a distal end of the enclosure means for receiving sawed particles from the enclosure means, and a pit means connected to the enclosure means beneath the base in communication with the opening means for receiving sawed particles from the opening means and the table having a flexible wiper means mounted on a distal end of the sliding table means and extending downward from the sliding table means to the base of the enclosure for wiping sawed particles rearward toward the opening means.

2. The brick saw apparatus of claim 1 wherein the enclosure means has an opening above the sliding table at a proximal end of the enclosure, and the enclosure means further comprising connective means connected peripherially to the opening and a door connected to the connective means for selectively proximal end opening and closing the opening whereby sawed particles are prevented from leaving the enclosure when the door is closed.

3. The brick saw apparatus of claim 2 wherein the opening at the proximal end of the enclosure includes room for the sliding table to slide through the opening and wherein the door is positioned above the sliding table and further comprising flexible wiper means attached to a bottom of the door and extending downward to the sliding table for wiping the sliding table as the table slides in a proximal direction from beneath the door.

4. The brick saw apparatus of claim 3 wherein the flexible wiper apparatus comprises flexible-stripped bristles extending downward to the sliding table.

5. The brick saw apparatus of claim 4 wherein the connective means comprises hinge means connected to a periphery of the proximal opening and connected peripherally to the door whereby the door swings outward with respect to the enclosure for access to the enclosure.

6. The brick saw apparatus of claim 3 wherein the enclosure means has an upward and rearward sloping proximal end, and wherein the edges of opening in the proximal end slope upward and rearward, and wherein the door mounted in the opening slopes upward and rearward whereby sawed particles striking the closed door are deflected downward toward the sliding table.

7. The brick saw apparatus of claim 3 wherein the sliding table has a large aperture whereby sawed particles fall through the aperture into a pit inside a proximal end of the enclosure means.

8. The brick saw apparatus of claim 7 wherein the door has an upward and downward opening forward and downward sloped chute connected across and inside of the door for catching sawed particles in an open upper end and passing sawed particles downward through the chute and outward through the open lower end to the sliding table and through the aperture in the sliding table.

9. The brick saw apparatus of claim 1 wherein the enclosure means has a downward and rearward sloping distal face above the opening means for deflecting sawed particles into the opening means and into the pit means.

10. The brick saw apparatus of claim 1 further comprising a door mounted above the sliding table and a second pit means mounted in the enclosure beneath the sliding table near the door and downward-extending wiper means connected to the sliding table above the second pit means for wiping particles into the second pit.

11. The brick saw apparatus of claim 1 wherein the sliding table comprises parallel handles extending away from the enclosure, whereby the sliding table may be gripped be the handles in moving the sliding table forward and rearward.

12. The apparatus of claim 11 wherein the door comprises an upper, upward and inward sloping portion, a hinge at the bottom of the upper portion, and a lower downward and inward sloping portion connected to the hinge, and adjustment means connected between the upper and lower portions for controlling slope of the lower portion, whereby the door urges dust particles toward the second pit means.

13. The brick saw apparatus of claim 12 wherein the adjustment means comprises a log positioned outwardly on the lower door portion, the log having a plurality of outward pointing notches, and an arm having a distal end configured for mounting in one of the notches, and wherein the adjustment means further comprises an outward extension on the upper door, and means to connect a proximal end of the arm at selected positions along the outward extension, whereby the upper and lower doors are adjustable relatively in slope for providing optimum direction of the dust particles toward the second pit means.

* * * * *